United States Patent
Rai

(10) Patent No.: US 11,271,484 B2
(45) Date of Patent: Mar. 8, 2022

(54) PRIMARY CONTROLLER CALIBRATION AND TRIMMING USING SECONDARY CONTROLLER IN SECONDARY-CONTROLLED FLYBACK CONVERTERS

(71) Applicant: Cypress Semiconductor Corporation, San Jose, CA (US)

(72) Inventor: Hariom Rai, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 88 days.

(21) Appl. No.: 16/891,867

(22) Filed: Jun. 3, 2020

(65) Prior Publication Data
US 2020/0412257 A1 Dec. 31, 2020

Related U.S. Application Data

(63) Continuation of application No. 16/455,503, filed on Jun. 27, 2019, now Pat. No. 10,862,399.

(51) Int. Cl.
*H02M 3/335* (2006.01)

(52) U.S. Cl.
CPC ... *H02M 3/33523* (2013.01); *H02M 3/33507* (2013.01); *H02M 3/33515* (2013.01); *H02M 3/33538* (2013.01)

(58) Field of Classification Search
CPC ......... H02M 3/33523; H02M 3/33507; H02M 3/33515; H02M 3/33538; H02M 1/32; H02M 1/36
See application file for complete search history.

(56) References Cited

U.S. PATENT DOCUMENTS

| | | | |
|---|---|---|---|
| 7,227,382 B1 | 6/2007 | Talbot et al. | |
| 10,651,754 B1 * | 5/2020 | Murugesan | H02M 3/33523 |
| 10,693,384 B1 * | 6/2020 | Mondal | H02M 3/33592 |
| 10,862,399 B1 * | 12/2020 | Rai | H02M 1/36 |
| 11,114,945 B2 * | 9/2021 | Ahmed | H02M 3/33592 |
| 2004/0217749 A1 | 11/2004 | Orr et al. | |
| 2004/0217750 A1 | 11/2004 | Brown et al. | |
| 2013/0188399 A1 | 7/2013 | Tang et al. | |
| 2014/0133186 A1 | 5/2014 | Balakrishnan et al. | |
| 2016/0365801 A1 | 12/2016 | Phadke | |
| 2017/0063243 A1 | 3/2017 | Gong | |

(Continued)

OTHER PUBLICATIONS

USPTO Ex Parte Quayle Action for U.S. Appl. No. 16/455,503 dated Jul. 21, 2020; 12 pages.

(Continued)

*Primary Examiner* — Kyle J Moody

(57) ABSTRACT

Communicating information stored at a secondary controller to a primary controller in a secondary-controlled flyback converter is described. In one embodiment, a method includes storing, by a secondary-side controller of a power converter, calibration information associated with a primary-side controller of the power converter. The power converter is a secondary-controlled alternating current to direct current (AC-DC) flyback converter comprising a galvanic isolation barrier. The method further includes sending, by the secondary-side controller, the calibration information to the primary-side controller across the galvanic isolation barrier in response to power-up of the power converter.

21 Claims, 7 Drawing Sheets

(56) References Cited

U.S. PATENT DOCUMENTS

2018/0084615 A1    3/2018   Kong et al.
2019/0341852 A1   11/2019   Fahlenkamp et al.

OTHER PUBLICATIONS

USPTO Notice of Allowance for U.S. Appl. No. 16/455,503 dated Aug. 19, 2020; 8 pages.
International Search Report for International Application No. PCT/US2020/034027 dated Jun. 19, 2020, 2 pages.
USPTO Non-Final Rejection for U.S. Appl. No. 16/455,503 dated Oct. 10, 2019; 18 pages.
USPTO Notice of Allowance for U.S. Appl. No. 16/455,503 dated Mar. 5, 2020; 9 pages.
Written Opinion of the International Searching Authority for International Application No. PCT/US2020/034027 dated Jun. 19, 2020, 9 pages.

* cited by examiner

PRIMARY CONTROLLER CALIBRATION AND TRIMMING USING SECONDARY CONTROLLER IN SECONDARY-CONTROLLED FLYBACK CONVERTERS

CROSS-REFERENCE TO RELATED APPLICATION

This application is a Continuation of U.S. patent application Ser. No. 16/455,503, filed Jun. 27, 2019, which is incorporated by reference herein.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. The USB-PD specification, however, allows power providers and power consumers to dynamically negotiate the levels of the provided voltages and currents. Under certain power delivery conditions, fault conditions can occur on the provided voltages/currents from the power provider, as well as other fault conditions can occur on the provided voltages/currents received by the power consumer.

BRIEF DESCRIPTION OF THE DRAWINGS

The disclosure is illustrated by way of example, and not of limitation, in the figures of the accompanying drawings.

DETAILED DESCRIPTION

Figure 1:
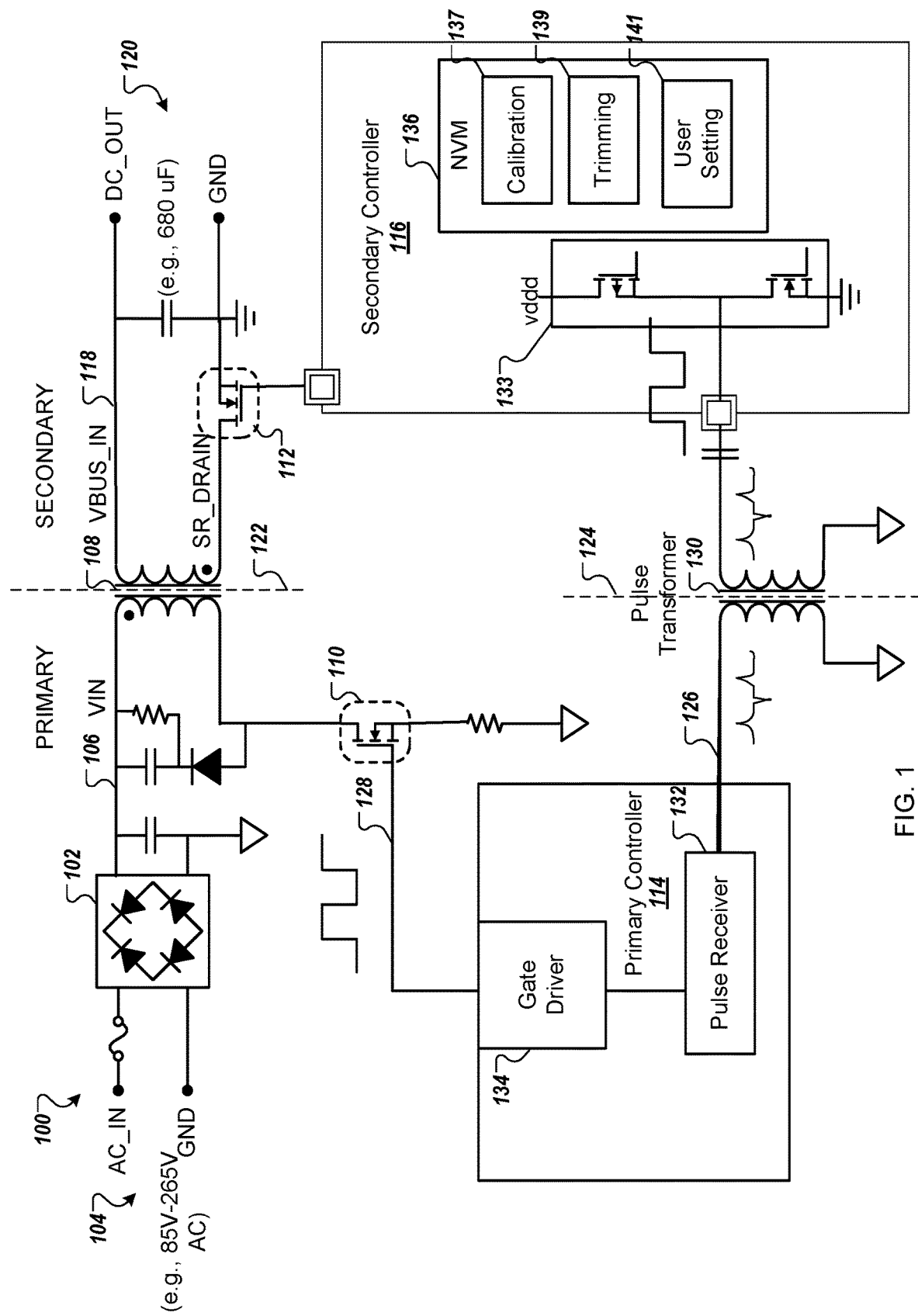
FIG. 1 is a block diagram of a secondary-controlled flyback converter with unidirectional communications over a galvanic isolation barrier from a secondary side to a primary side according to one embodiment.

The following description sets forth numerous specific details such as examples of specific systems, components, methods, and so forth, in order to provide a good understanding of various embodiments of the techniques described herein for calibration and trimming of a primary controller using a secondary controller in a secondary-controlled flyback converter, such as used in USB power delivery applications. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for calibrating and trimming a primary integrated circuit (IC) using a secondary IC in a secondary-controlled flyback converters coupled to power lines in electronic devices in USB-PD. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication, battery charging, and/or power delivery. The embodiments described herein can be used for AC-to-DC power adapters, GaN based power adapters operating at 600 kHz frequencies, power adapters with primary or secondary side controllers, power adapters operating in modes of operations, such as quasi-resonant mode (QR), discontinuous conduction mode (DCM), continuous conduction mode (CCM), or the like. The embodiments described herein can be used in power-adapter solutions along with Type-C PD capability. These embodiments can reduce the overall cost of the system and provide better performance for the primary IC by calibrating the primary IC with the information stored at the secondary IC.

A USB-enabled electronic device or a system may comply with at least one release of a Universal Serial Bus (USB) specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C, is defined in various releases and/or versions of the USB Type-C specification (e.g., such as Release 1.0 dated Aug. 11, 2014, Release 1.1 dated Apr. 3, 2015, etc.). The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification (e.g., such as Revision 1.0 released Jul. 5, 2012, Revision 2.0 released Aug. 11, 2014, etc., or later revisions/versions thereof). The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides power is typically referred to as (or includes) a "provider" (or a power source), and the device that consumes power is typically referred to as (or includes) a "consumer" (or a power sink). A power path typically includes a power switch coupled in-line on the VBUS line and configured to turn the delivery of power on and off.

A USB-PD power source may be configured to draw power from an alternating current (AC) power adapter or from another AC source. Thus, as part of an alternating current-to-direct current (AC-DC) conversion, some implementations may use a large bulk capacitor on the power source side of the VBUS line in order to remove the AC component of the power signal. Turn-ON and turn-OFF of power switches (also referred to as power FETs) may allow for further circuit protection based on analysis of current and voltage conditions and the detection of faults.

With a secondary-controlled flyback converter, also referred to as a secondary based power adapter, a primary-side controller does not need to have much intelligence and can be made with high voltage and analog custom circuit in a higher technology node to save on costs. Any intelligence added to the primary-side controller results in: Larger chip area due to higher technology node, which results in higher costs; higher mask count due to the intelligence logic circuitry needing more fuses or non-volatile memory, which results in higher costs; and Higher Power loss due to additional circuit (current taken at higher voltages). Hence, the primary-side controller cannot have programmable registers, like E-fuse array or Flash memory, causing costs to increase due to much bigger die-size and additional masks. This process has at least the following drawbacks: no programming options on silicon, no optimizations are possible, wider variations, sub-optimal performance, or the like. Thus, critical parameters need external components and pins to adjust based on an application. However, pin allocation or bigger packages also increase the bill of material costs and more printed circuit board area to accommodate.

Described herein are various embodiments of techniques for providing calibrations and trimming information for a primary-side IC by a secondary-side IC in a secondary-controlled flyback converter. The embodiments described herein may address the above-mentioned and other challenges by providing information, stored in the secondary-side controller, across a galvanic isolation barrier and without the additional logic and circuits and complicated protocols described above. In some cases, the embodiments can provide calibration information, trimming information, or the like, that is stored in the secondary-side controller. For example, a hardware- or firmware-controlled scheme can define a transfer of information using multiple consecutive pulse (e.g., +ve or −ve pulses) given across a galvanic isolation barrier, such as across a pulse transformer, to notify the primary-side controller of the transfer and to transfer the data itself. The primary-side controller can include logic to program each component with the respective information being transferred across the galvanic isolation barrier. The embodiments in which a full package solution of primary and secondary controllers (e.g., Primary+Secondary (System in Package (SiP))) can have trimming data for Primary IC, stored on in non-volatile memory (NVM) (e.g., flash memory) in the Secondary IC. At power-up, this data can be transferred to the primary IC using a pulse-transformer before taking over the control of the flyback converter. The embodiments described herein can make the primary IC more accurate and configurable, allowing savings on pins, costs, and bill of materials. The embodiments described herein can provide a firmware-based optimization of the primary-side controller without the additional circuitry on the primary-side controller. The embodiments described herein can provide firmware-based modifications related to a specific board design. The embodiments described herein can provide better accuracy of the flyback converter based on trimmed parameters on the primary-side controller without increasing primary die-size or mask steps. The embodiments described herein can reduce the bill of materials on the primary-side of the flyback converter, such as by reducing external resistance required for constant current or external cap required for soft-start ramp and the like. The embodiments described herein can save on cost and board space.

The embodiments described herein may address the above-mentioned and other challenges by providing, a serial bus-compatible power supply device, such as a serial bus power delivery (SBPD) device with a power control analog subsystem having hardware, firmware, or any combination to store information, including calibration and trimming information, at a secondary-side controller and communicate this information over a galvanic isolation barrier to a primary-side controller. The SBPD (also referred to as a "source device" herein) may be a USB compatible power supply device.

FIG. 1 is a block diagram of a secondary-controlled flyback converter 100 with unidirectional communications over a galvanic isolation barrier according to one embodiment. The secondary-controlled flyback converter 100 can be part of an AC-DC power adapter device. The secondary-controlled flyback converter 100 includes a rectifier 102 (e.g., full-bridge rectifier) coupled between AC input terminals 104 and a rectified DC line 106 (VIN), a flyback transformer 108, the flyback transformer 108 including a primary winding coupled to the rectified DC line 106, a primary-side power switch 110 (e.g., a primary-side field effect transistor (FET), a power FET, or a primary FET), a secondary-side power switch 112 (e.g., secondary-side FET 112, power FET, or secondary FET), a primary-side controller 114, and a secondary-side controller 116. The rectified DC line 106 is coupled to a first end of a primary winding of the flyback transformer 108. VIN is the voltage on the rectified DC line 106 after the rectifier 102. A second end of the primary winding is coupled to a primary drain of the primary-side FET 110. A first end of the secondary winding of the flyback transformer 108 is coupled to a direct current (DC) output line 118 (VBUS) and a second end of the secondary winding is coupled to a secondary drain of the secondary-side FET 112 (SR_Drain). VBUS is voltage on the DC output of the flyback transformer 108. SR_Drain is the drain node of the secondary-side FET 112. The DC output line 118 and the secondary-side FET 112 are coupled to DC output terminals 120.

The secondary-controlled flyback converter 100 is used for AC-DC conversion with galvanic isolation between the inputs and any outputs. The secondary-controlled flyback converter 100 uses an inductor split with the flyback transformer 108 with a galvanic isolation barrier 122 between a primary side and a secondary side. When the primary-side power switch 110 (the primary-side FET) is closed, the primary-side of the flyback transformer 108 is connected to the input voltage source. In this embodiment, the primary-side of the flyback transformer 108 is coupled to the rectifier 102. As the primary current and magnetic flux in the flyback transformer 108 increases, energy is stored in the transformer core of the flyback transformer 108. The voltage induced in the secondary winding is negative and blocked. When the primary-side power switch 110 (the primary-side FET) is opened, the primary current and magnetic flux drops. The secondary voltage is positive, allowing current to flow from the flyback transformer 108. The energy from the transformer core supplies an output load. An output capacitor can be used to charge and supply energy to the output load. Thus, the flyback transformer 108, based on control of the primary-side power switch 110 can store energy and transfer the energy to the output of the secondary-controlled flyback converter 100. It should also be noted that the secondary-controlled flyback converter 100 can include other components in the input stage, in the output stage, or in both. For example, a bulk capacitor can be coupled between the output of the rectifier 102 and a ground node. During operation, the AC input power is rectified and filtered by the rectifier 102 (bridge rectifier) and the bulk capacitor. This creates a DC high voltage bus which is connected to the primary winding of the flyback transformer 108. Similarly, in the output stage, the secondary winding power is rectified and filtered, such as by a diode, a capacitor, output LC-filters, or the like, to reduce the output voltage ripple. Other output voltages can also be realized by adjusting the flyback transformer's turn ratio and the output stage.

The secondary-controlled flyback converter 100 operates as an isolated power converter. The two prevailing control schemes are voltage mode control and current mode control. Both control schemes use a signal related to the output voltage.

In the depicted embodiment, the primary-side controller 114 (also referred to as primary-side controller 114) and the secondary-side controller 116 (also referred to as secondary-side controller 116) are configured for calibration and trimming the primary-side controller 114 using information stored at the secondary-side controller 116 and communicated over a galvanic isolation barrier 124. During operation, in one embodiment, the primary-side controller 114 is configured to receive a signal 126 from the secondary-side controller 116 across the galvanic isolation barrier 124. The primary-side controller 114 applies a pulse signal 128 to the primary-side FET 110, in response to the signal 126 to turn-on and turn-off the primary-side FET 110. However, at power-up the secondary-side controller 116 can initiate transfer of information, stored at the secondary-side controller 116, across the galvanic isolation barrier 124 before controlling the primary-side FET 110. In other embodiments, the secondary-side controller 116 can transfer information for other purposes.

In one embodiment, secondary-controlled flyback converter 100 includes a pulse transformer 130 coupled between the primary-side controller 114 and the secondary-side controller 116. The primary-side controller 114 is configured to receive the signal 126 from the secondary-side controller 116 as one or more pulses via the pulse transformer 130. The primary-side controller 114 can include a pulse receiver 132 to receive the pulse signal 128 from the secondary-side controller 116 across the galvanic isolation barrier 124. The pulse receiver 132 can change the primary-side turn-on pulse based on output of the flyback transformer 108 (e.g., a PWM pulse sent from secondary-controller 116 in response to an Error Amplifier (EA) output on secondary side). With higher EA voltages, wider PWM pulse send from secondary-controller 116 via pulse transformer 130 which results in wider primary turn-on pulse for Primary FET 110. The primary-side controller 114 can also include a gate driver 134 coupled to the pulse receiver 132 and a gate of the primary-side FET 110. As described herein, the turn-on and turn-off pulses can have fixed widths or variable widths. In one embodiment, the pulse receiver 132 can include a pulse width modulation (PWM) circuit. Alternatively, the pulse receiver 132 can use other types of circuits to receive the pulses across the galvanic isolation barrier 124.

In one embodiment, the primary-side controller 114, in order to apply the pulse signal 128 to the primary-side FET 110, is configured to receive a turn-on pulse (PTDRV) from the secondary-side controller 116. The primary-side controller 114 applies the turn-on pulse to the gate of the primary-side FET 110 via the gate driver 134. The turn-on pulse causes the primary drain of the primary-side FET 110 to go "low," i.e., from a higher state to a lower state (e.g., a first voltage level corresponding to a first state or representing the digital value of one) and the secondary drain of the secondary-side FET 112 to go from a lower state to a higher state. Subsequently, the primary-side controller 114 receives a turn-off pulse from the secondary-side controller 116 and applies the turn-off pulse to the gate of the primary-side FET 110 via the gate driver 134. The turn-off pulse causes the primary drain of the primary-side FET 110 to go "high," i.e., from a lower state to a higher state (e.g., a second voltage level corresponding to a second state or representing the digital value of zero) and the secondary drain of the secondary-side FET 112 to go low.

For example, in a secondary-controlled power adapter (also referred to herein as a secondary-controlled power converter), a pulse transformer can be used to transfer pulse width modulation (PWM) pulse information from a secondary-side controller (also referred to as secondary IC or secondary controller) to a primary-side controller (also referred to as primary IC or primary controller) to turn-on or turn-off the primary-side FET using pulses (e.g., +ve and −ve pulses) for a high-going edge and a low-going edge, respectively. In conventional systems, as a "1" gets defined as positive pulse and "0" as negative pulse, it is not possible to send any other pattern (like 0 0) from secondary-side controller to primary-side controller, except by stopping the PWM pulses. If the primary-side controller does not receive the PWM pulses via the pulse transformer, it goes into a soft-start mode and performs multiple soft-start operations (for a few seconds) before latching off, which will stop the converter. It should be noted that the pulses can be other types of pulses than PWM pulses.

In the depicted embodiment, the secondary-side controller 116 includes a non-volatile memory 136 to store calibration information 137 and trimming information 139. The non-volatile memory 136 can be implemented as one or more NVM devices. The secondary-side controller 116, in response to a power-up event, can communicate the information stored in the non-volatile memory 136 to the primary-side controller 114 across the galvanic isolation barrier 124 via the pulse transformer 130, as described herein. The primary-side controller 114 can detect the information and apply the calibration and trimming information to program components of the primary side of the flyback converter 100. In a further embodiment, to communicate the information to the primary-side controller 114 across the pulse transformer 130, the secondary-side controller 116 varies a sequence of pulses of the pulse signal to generate a specific pattern in the pulse signal 128. The specific pattern in the pulse signal 128 corresponds to the information stored in the non-volatile memory 136, being communicated by the primary-side controller 114.

In one embodiment, at the time of SiP (System-in-Package), the primary IC's trimming data can be stored in specific locations of non-volatile memory (e.g., Flash) in the secondary IC. The non-volatile memory can have space allocated to store the trimming date for primary IC. At power-up, the secondary IC can send a specific pattern to the primary IC to notify the primary IC that the secondary IC is going to start sending the trimming information in a pre-defined sequence.

In one embodiment, the secondary-side controller 116 includes a programmable driver 133 to generate a signal 126 with the specific pattern at boot-up, as well as a sequence of pulses that represent the information being transferred from the non-volatile memory 136 to the primary-side controller 114 over the galvanic isolation barrier 124. Using the programmable driver 133, the secondary-side controller is able to send any combination of 0s and 1s with a specific pattern (protocol) from the non-volatile memory 136 of the secondary-side controller 116 to the primary-side controller 114 without a requirement of clock synchronization. In one embodiment, the secondary-controller 116 includes a state machine to synchronize each function of the primary-side controller 114 to be programmed (e.g., calibrated, trimmed, or the like). In addition to calibration information 137 and trimming information 139, the secondary-side controller 116 can store other information, such as user-defined settings 141, in the non-volatile memory 136. For example, the user defined settings pertaining to the primary-side functionality, such as over-voltage (OV), under-voltage (UV), over-current (OC), short-circuit detection, over-temperature (OT), line voltage, peak current limits, or the like, can be stored in the non-volatile memory 136 of the secondary-side controller 116. Firmware of the secondary-side controller 116 can transfer this information to the primary-side controller 114 in a similar manner at appropriate times, such as at boot-up or later during operation of the converter at a specific time.

As illustrated in FIG. 1, the secondary-side controller 116 can communicate the stored information to the primary-side controller 114 over the galvanic isolation barrier 124, such as via the pulse transformer 130. Additional details of the programmable driver 133 are described below with respect to FIG. 2.

Figure 2:
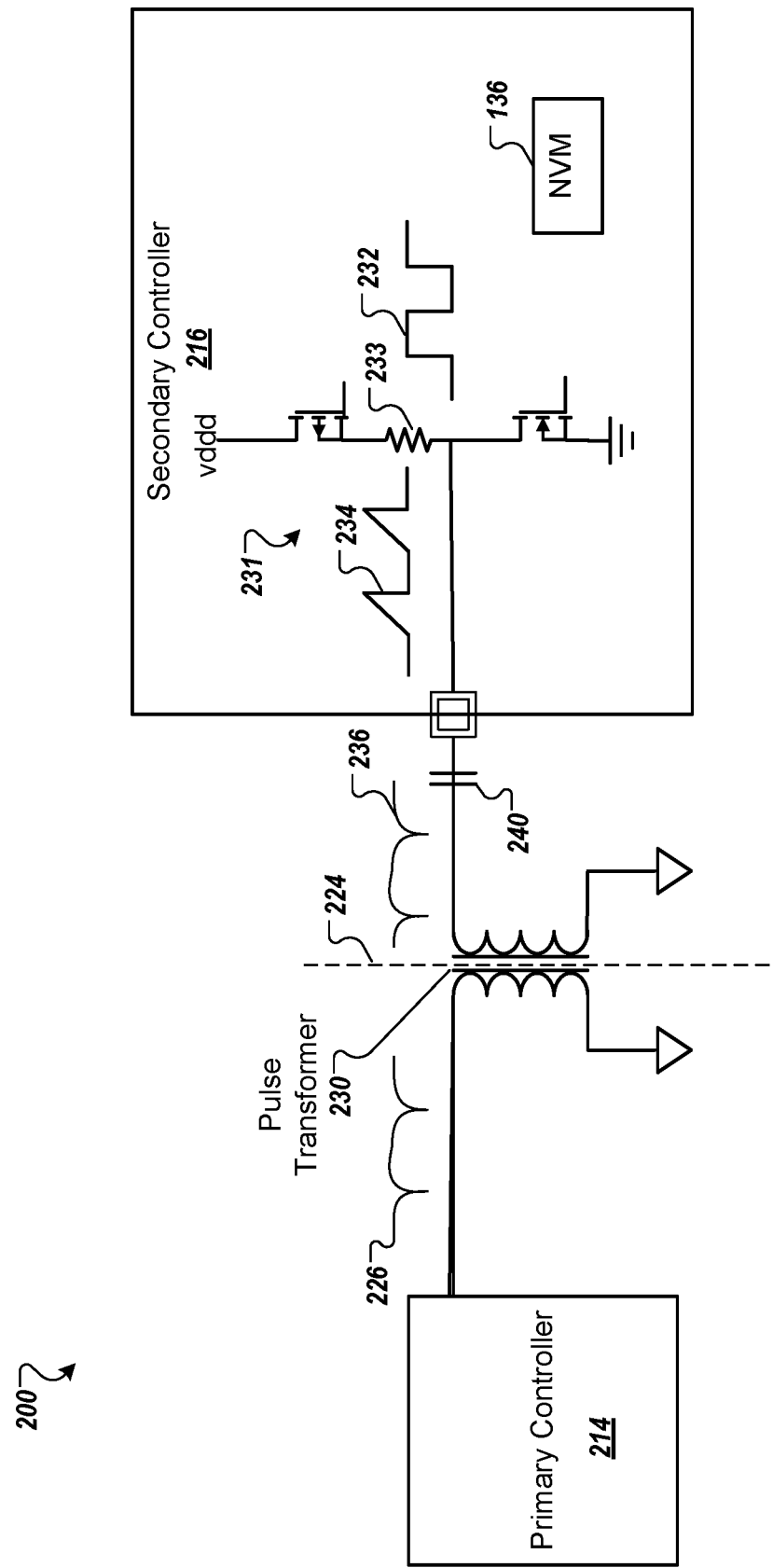
FIG. 2 is block diagram of a secondary-controlled flyback converter with a secondary-side controller that communicates information to a primary-side controller over a galvanic isolation barrier according to one embodiment.

FIG. 2 is block diagram of a secondary-controlled flyback converter 200 with a secondary-side controller 216 that communicates information to a primary-side controller 214 over a galvanic isolation barrier 224 according to one embodiment. Although not all components of the secondary-controlled flyback converter 200 are shown, the secondary-controlled flyback converter 200 is similar to the secondary-controlled flyback converter 100 of FIG. 1 as noted by similar reference numbers. To control the flyback transformer via the primary-side power switch (not illustrated in FIG. 2), the secondary-side controller 216 can send pulses to the primary-side controller 214 across a galvanic isolation barrier 224, such as via a pulse transformer 230.

The secondary-side controller 216 includes a signal generator 231 (also referred to as a programmable driver) to generate pulses to control the primary-side FET 110 via the pulse transformer 230. For example, the signal generator 231 can include a pull-up transistor and a pull-down transistor. The pull-up and pull-down transistors can be controlled by control logic or firmware of the secondary-side controller 216. During a normal mode, the signal generator 231 can generate and output a square wave signal. A capacitor 240 is coupled between the signal generator 231 and the pulse transformer 230. The capacitor 240 generates a positive pulse on a positive transition of the square wave signal (i.e., rising edge) and a negative pulse on a negative transition of the square wave signal (i.e., falling edge). The positive and negative pulses are transferred to the primary-side controller 214 via the pulse transformer 230. The primary-side controller 214 receives the positive and negative pulses to turn-on and turn-off the primary-side power switch (not illustrated in FIG. 2). Example waveforms of the square wave generated by the signal generator 231 are shown in FIG. 1. Example waveforms of the positive and negative pulses, generated by the capacitor are shown in FIG. 1. The secondary-side controller 216 can generate the square wave signal during normal operation (e.g., in a normal operating mode). The secondary-side controller 216 can operate in a second mode, such as a calibration mode, a trimming mode, a power-up mode, or the like, in which the secondary-side controller 216 communicates information across the galvanic isolation barrier 224. In such cases, the secondary-side controller 216 can switch a resistor 233 between the pull-up transistor and the capacitor 240. It should be noted that the resistor 233 can be any type of resistive element. As a result, the signal generator 231 generates a sawtooth wave signal 234 with a slow rising edge and a faster falling edge than the slow rising edge. Given the edges of the sawtooth wave signal 234, the capacitor 240 does not generate a positive pulse for each pulse in the sawtooth wave signal 234, creating a pulse signal 236 with two or more consecutive negative pulses. The consecutive negative pulses of the pulse signal 236 are transferred to the primary-side controller 214 via the pulse transformer 230. The primary-side controller 214 receives the consecutive negative pulses to detect that the secondary-side controller 216 is communicating information to the primary-side controller 214. For example, the information may include calibration information, trimming information, settings, or the like, that are stored in the secondary-side controller 216 for programming the primary-side controller 214. In some cases, the secondary-side controller 216 can send a specific pattern to the primary-side controller 214 to initiate programming. In response to the primary-side controller 214 detecting the specific pattern, the primary-side controller 214 can perform actions to receive the information and program respective components or functions of the primary-side controller 214 accordingly. Although the pulse signal 236 includes two consecutive negative pulses (i.e., without any intervening positive pulses), which can represent two consecutive "0" values being sent across the galvanic isolation barrier 224, in other embodiments, other specific patterns can be generated by the secondary-side controller 216 and detected by the primary-side controller 214. For example, the secondary-side controller 216 can extend the signal generator 231 to generate two or more consecutive "1" values or even a pattern of 0s and 1s to give multiple fault conditions or other information from the secondary-side controller 216 to the primary-side controller 214. The other information may include settings for a Start pattern, a Stop pattern, a Soft Fault asking for a soft-start operation, a Soft Fault asking for a minimum power delivered, or the like. Similarly, a resistor in series with a pull-down device can be used to generate consecutive 1s.

In some cases, in order to send two consecutive 0s, two "−ve" pulses are required, which conventionally would require fast clock synchronization on the primary side. In the disclosed embodiments, the two consecutive 0s can be initiated by firmware. The pull-up transistor and pull-down transistor can be controlled for a programmable slow pull-up at the input of the pulse transformer 230, followed by a sudden pull-down, resulting in "−ve" edge without a "+ve" edge. Similarly, another programmable slow pull-up followed by sudden pull-down would result in another "−ve" edge. It should be noted that the slow pull-up can be realized by switching the resistor 233 into the pull-up path. Alternatively, the slow pull-up can be realized by a current source based pull-up.

Figure 3:
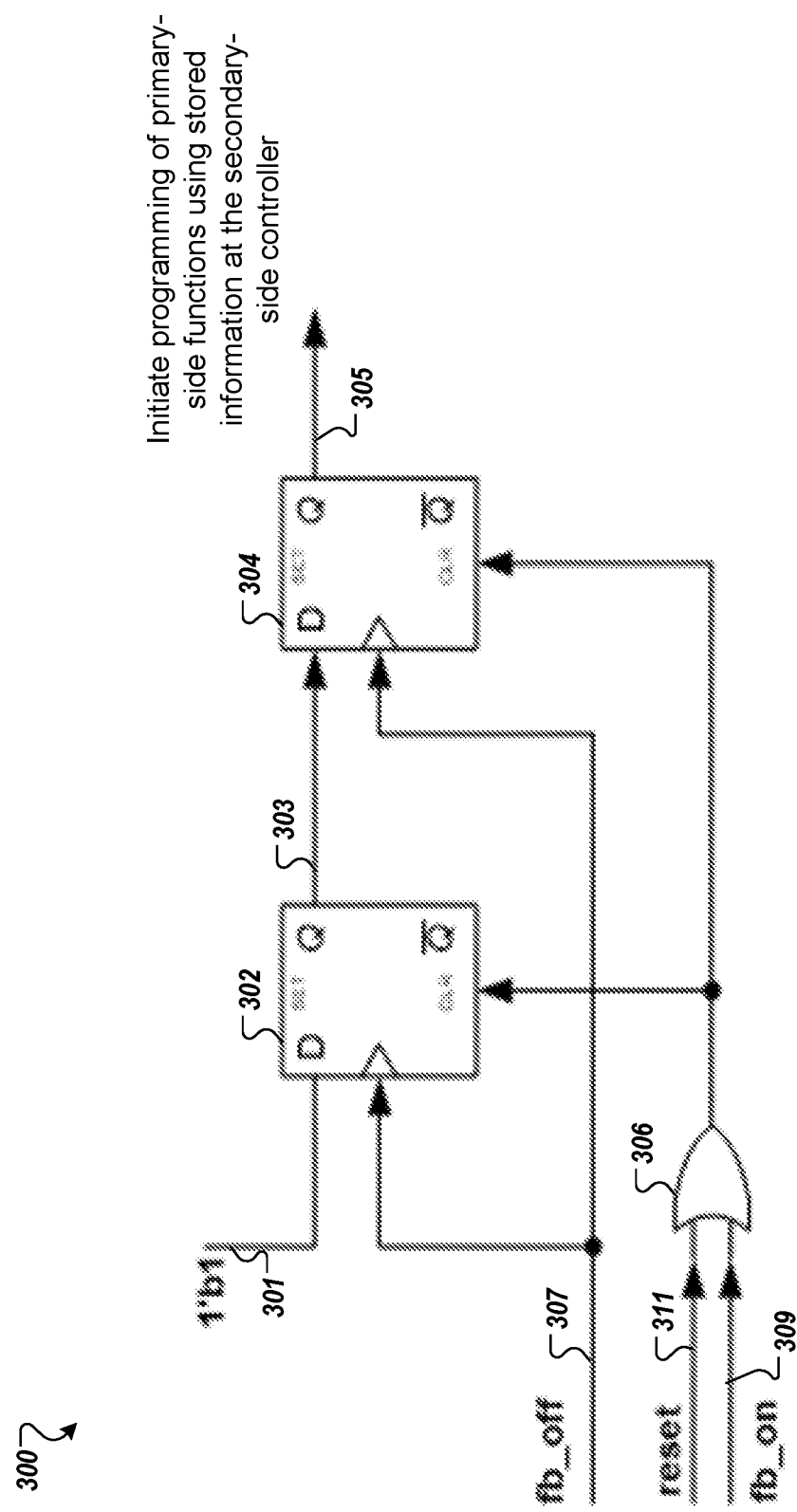
FIG. 3 is a block diagram of a circuit of a primary-side controller to detect a signal pattern from a secondary-side controller to initiate programming functions of the primary-side controller using stored information at a secondary-side controller according to one embodiment.

As illustrated in FIG. 2, the secondary-side controller 216 sends two consecutive 0s in the pulse signal 236 and the primary-side controller 214 receives two consecutive 0s in the pulse signal 226. The primary-side controller 214 can include circuitry to detect the two consecutive 0s in the pulse signal 226, such as illustrated in FIG. 3. Alternatively, the primary-side controller 214 can include circuitry to detect other patterns to detect information being communicated by the secondary-side controller 216.

FIG. 3 is a block diagram of a circuit 300 of a primary-side controller to detect a signal pattern from a secondary-side controller to initiate programming functions of the primary-side controller using stored information at a secondary-side controller according to one embodiment. The circuit 300 includes a first flip-flop 302, a second flip-flop 304, and an OR gate 306. The first flip-flop 302 receives a first input value 301 (e.g., 1'b1) that would initiate programming if propagated through both the first flip-flop 302 and the second flip-flop 304. The second flip-flop 304 receives a second input value 303 from an output of the first flip-flop 302 when the first flip-flop 302 is clocked by high going pulse 307, corresponding to a 0 pulse (negative pulse 236 illustrated in FIG. 2) in the pulse signal received by the primary-side controller. The 0 pulse 307 is labeled as an fb_off signal that is output of a pulse receiver circuit that will be high when the pulse goes negative from the pulse transformer. Similarly, an fb_on signal (signal 309) is the output of pulse receiver circuit that will be high when the pulse goes positive from the pulse transformer. The second flip-flop 304 outputs an output value 305 when the second flip-flop 304 is clocked by a 0 pulse 307 (negative pulse) in the pulse signal received by the primary-side controller. However, if an intervening high going pulse (positive pulse) at the input of the primary controller from the pulse transformer 330, which corresponds to a high going pulse 309 is received by the primary-side controller between the two 0 pulses 307, the first and second flip-flops are cleared. For example, when the OR gate 306 receives the high pulse 309 or a reset signal 311, the OR gate 306 can output a reset (or clear) signal to the clear inputs of both the first flip-flop 302 and second flip-flop 304. Although FIG. 3 shows one embodiment of the circuit 300 to detect two consecutive zeros, in other embodiments, the circuit 300 can include different logic or circuit components to detect the two consecutive zeros or other specific patterns in the pulse signal received by the primary-side controller across the galvanic isolation barrier.

In this embodiment, the output value 305 can initiate programming functions of the primary-side controller using stored information at a secondary-side controller. For example, the primary-side controller can include logic that can perform a predefined sequence to calibrate, trim, or otherwise program functions or components of the primary-side controller according to the information stored at the secondary-side controller.

In another embodiment, an AC-DC power adapter device includes a flyback transformer coupled between AC terminals and DC terminals. The flyback transformer converts AC power on the AC terminals to DC power on the DC terminals with galvanic isolation between the AC terminals and the DC terminals. The AC-DC power adapter device also includes a primary-side controller and a second-side controller both coupled to the flyback transformer. The flyback transformer is coupled to a primary-side power switch and a secondary-side power switch. The AC-DC power adapter device also includes a pulse transformer with a galvanic isolation barrier between the primary-side controller and the secondary-side controller. The secondary-side controller includes non-volatile memory and is configured to store information associated with the primary-side controller send the information to the primary-side controller across the galvanic isolation barrier via the pulse transformer.

In a further embodiment, the primary-side controller includes a Pulse receiver and a gate driver, such as those described above. The pulse receiver receives the signal from the secondary-side controller across the galvanic isolation barrier, and the gate driver drives a signal at a gate of the primary-side FET to turn-on and turn-off the primary-side FET. In a further embodiment, the AC-DC power adapter device also includes a rectifier coupled between the AC and an AC line (Vin). The AC line is coupled to a first end of a primary winding of the flyback transformer. A second end of the primary winding is coupled to a primary drain of the primary-side FET. A first end of the secondary winding of the flyback transformer is coupled to a DC output line (VBUS) and a second end of the secondary winding is coupled to a secondary drain of a secondary-side FET. A bulk capacitor is coupled between the AC line and a ground node. The primary-side controller, to apply the pulse signal to the primary-side FET, is configured to: receive a turn-on pulse from the secondary-side controller; apply the turn-on pulse to a gate of the primary-side FET, the turn-on pulse causing a primary drain of the primary-side FET to go high and the secondary drain of the secondary-side FET to go high; receive a turn-off pulse from the secondary-side controller; and apply the turn-off pulse to the gate of the primary-side FET, the turn-off pulse causing the primary-side FET to go low and the secondary drain to go low.

In another embodiment, the primary-side controller includes logic circuitry to detect a specific pattern in a signal from the pulse transformer. In another embodiment, the primary-side controller includes logic circuitry to detect at least two consecutive zeros or two consecutive ones in a signal from the pulse transformer or any specific pattern.

Figure 4:
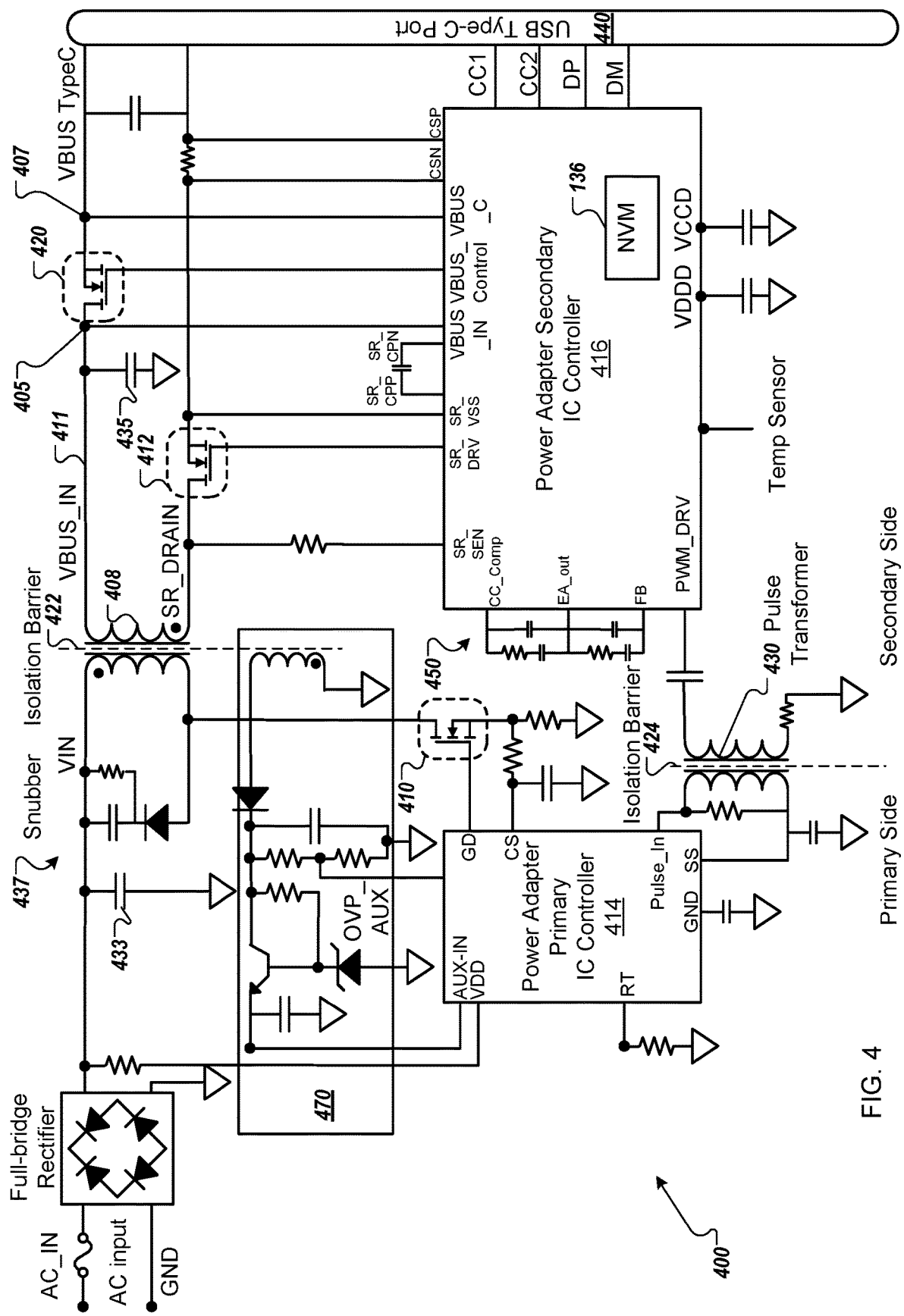
FIG. 4 is a schematic diagram of a USB-PD power adapter with non-volatile memory to store information to be communicated by a secondary-side controller over an isolation barrier to a primary-side controller

FIG. 4 is a schematic diagram of a USB-PD power adapter 400 with non-volatile memory 436 to store information to be communicated by a secondary-side controller over an isolation barrier to a primary-side controller according to one embodiment. Instead of opto-isolator feedback, the USB-PD power adapter 400 can communicate information stored in the non-volatile memory 436 across the isolation barrier via a pulse transformer 430. The USB-PD power adapter 400 includes a primary IC controller 414 and a secondary IC controller 416. The secondary IC controller 416 may be disposed in a chip package and includes a USB-PD subsystem configured in accordance with the techniques for gate driver control described herein. The secondary IC controller 416 is configured to negotiate a PD contract with a consumer device (not shown) attached to USB Type-C port 440 and to control through an output pin ("PWM_DRV") the required VBUS voltage that is output from flyback transformer 408. USB Type-C port 440 is typically associated with a Type-C plug, but it should be understood that in various embodiments the USB Type-C port may be associated with a Type-C receptacle instead. The secondary IC controller 416 includes the non-volatile memory 436. The non-volatile memory 436 can store similar information as descried above with respect to non-volatile memory 136 of FIG. 1. The flyback transformer 408 is coupled to a rectified DC power source and the output can be coupled to a secondary side FET 412 (e.g., SR FET 412). The VBUS_IN is regulated by an error amplifier which is connected to a compensation network 450. The compensation network 450 can be a resistor-capacitor (RC) circuit specific to the design of the USB-PD power adapter 500. The compensation network 450 can be coupled to receive a feedback signal from a first output pin ("FB") of the secondary IC controller 416. The compensation network 450 can also be coupled to a second output pin ("EA_out") and a third output pin ("CC_Comp"). The flyback transformer 408 can be coupled to a large bulk capacitor 433, and a snubber circuit 437. The USB-PD power adapter 400 may also include the pulse transformer 430 (or other feedback control mechanisms) for communicating information across an isolation barrier 424.

The secondary IC controller 416 is coupled to VBUS line 411 and is configured to control the operation and state of power switches (such as power switch 420) when fault conditions are detected by providing control signals to the gate of the power switches. VBUS line 411 includes power switch 420 configured as an on/off switch device controlled by signals from an output pin ("VBUS_Control") of a gate driver in the secondary IC controller 416. Provider switch 420 may correspond to a provider FET described herein. On one side of provider switch 420, a power source node 405 on the VBUS line 411 is coupled to second winding of the flyback transformer 408, which is coupled to a large bulk capacitor 435 configured to remove the AC component of the power signal. Power source node 405 is coupled to an input pin ("VBUS_IN") of the secondary IC controller 416. On the other side of provider switch 420, an output node 407 on the VBUS line 411 is coupled to USB Type-C port 440. Output node 407 is coupled to another input pin ("VBUS_C") of the secondary IC controller 416. The GND line of USB Type-C port 440 is coupled to a secondary provider FET 412.

In operation, the direction of power flow on VBUS line 411 is from the flyback transformer 408 to a consumer device, such as a laptop computer (not shown), that is attached to USB Type-C port 440. When a PD contract with the consumer device is negotiated, the secondary IC controller 416 turns on the provider switch 420 to provide power to the consumer device at the negotiated voltage and/or current level(s). A high-to-low voltage transition on VBUS line 411 may be needed when the PD contract is dynamically re-negotiated to lower the VBUS voltage and/or current, e.g., when the consumer device has finished charging its battery and now needs power only to operate.

On detection of fault conditions, a control signal may be sent to turn off the provider switch 420, thereby disconnecting the USB Type-C port 440 from the flyback transformer 408. The provider switch 420 is turned off by driving the output of VBUS_Control to zero. This disconnection may be caused by an over-voltage condition, an over-current condition, or other conditions that may require disconnection of the USB Type-C port 440 from the flyback transformer 408 for protection of circuits coupled to the USB Type C port 440.

In a further embodiment, an auxiliary circuit 470 that can be coupled to the primary IC controller 414. An auxiliary output pin ("AUX_IN") and an overvoltage protection auxiliary pin ("OVP_AUX") are couple to the auxiliary circuit 470. The auxiliary circuit 470 can operate to protect for overvoltage of the VBUS_IN 411 and also provide power (AUX_IN) to the Primary IC 414 once start-up is complete.

As noted above, the USB-PD power adapter 400 permits communications over the isolation barrier 424 in a similar manner as described above with respect to FIGS. 1-3. In particular, a PWM driver circuit of the secondary IC controller 416 can output a signal on an output pin ("PWM_DRV") to communicate information across the isolation barrier 424 via the pulse transformer 430. The primary IC controller 414 can include a detection circuit that receives a signal on an input pin ("Pulse_In") and detects when the secondary IC controller 416 is communicating information. For example, the secondary IC controller 416 can detect a fault condition and can communicate this information to the primary IC controller 414 via the pulse transformer 430. In another embodiment, the primary IC controller 414 can communicate information across the isolation barrier 422 via the flyback transformer 408.

In another embodiment, an AC-DC power adapter device includes a flyback converter (with a flyback transformer) or an isolated power converter that is coupled between AC terminals and DC terminals. The flyback transformer converts AC power on the AC terminals to DC power on the DC terminals with galvanic isolation between the AC terminals and the DC terminals. The AC-DC power adapter device also includes a primary-side controller coupled to the flyback transformer and a secondary-side controller coupled to the flyback transformer. A primary-side power switch (also referred to as primary-side switching FET or primary FET) is coupled to a primary winding of the flyback transformer and the primary-side controller. A secondary-side power switch is coupled to a secondary winding of the flyback transformer and the secondary-side controller. The primary-side controller is configured to receive a first signal from the secondary-side controller across a galvanic isolation barrier and apply a second signal to the primary-side power switch in response to the first signal to turn-on and turn-off the primary-side power switch. The secondary-side controller is also configured to communicate information to the primary-side controller across the pulse transformer, as described herein.

In a further embodiment, the primary-side controller includes a pulse receiver and a gate driver. The pulse receiver receives the first signal from the secondary-side controller across the galvanic isolation barrier. The first signal includes a first turn-on pulse to turn-on the primary-side power switch and a first turn-off pulse to turn-off the primary-side power switch. In response, the driver, which is coupled to the pulse receiver and the primary-side power switch, applies the first turn-on pulse and the first turn-off pulse to the primary-side power switch.

In a further embodiment, the AC-DC power adapter device includes a pulse transformer coupled between the primary-side controller and the secondary-side controller. The primary-side controller is configured to receive the first signal from the secondary-side controller as one or more pulses via the pulse transformer. The primary-side controller can detect when the secondary-side controller is communicating information via the pulse transformer as described herein.

The embodiments described herein can be implemented in a power delivery system, such as a serial bus-compatible power supply device. An example of a serial bus-compatible power supply device may include a serial bus power delivery (SBPD) device, a USB-compatible power supply device, or the like. In some embodiments, SBPD device is USB-PD device that is compatible with the USB-PD standard or more generally with the USB standard. For example, SBPD device may be used to provide an output voltage (e.g., Vbus_c, power supply voltage) based on an input voltage (e.g., Vbus_in, power supply voltage). The SBPD device may include the various embodiments described herein to facilitate communications between a primary-side controller and a secondary-side controller. The SBPD device may include a power converter 150 (e.g., an AC-DC converter) and a power control analog subsystem (e.g., a USB-PD controller). The power control analog subsystem may include the circuitry, functionality, or both, as described herein for communicating information across a galvanic isolation barrier. The information can include information for different functions, such as OV, UV, OCP, SCP, PFC, SR, or the like. The information can include fault information for any of these different functions.

In embodiments, SBPD device is connected to power source, such as a wall socket power source that provides AC power. In other embodiments, power source may be a different power source, such as a battery, and may provide DC power to SBPD device. The Power converter may convert the power received from power source (e.g., convert power received to Vbus_in). For example, power converter may be an AC-DC converter and convert AC power from power source to DC power. In some embodiments, power converter is a flyback converter, such as a secondary-controlled flyback converter, that provides galvanic isolation between the input (e.g., primary side) and the output (e.g., secondary side).

In some embodiments, SBPD device provides Vbus_c to a sink device (e.g., via communication channel (CC) specifying a particular output voltage, and possibly an output current). SBPD device may also provide access to ground potential (e.g., ground) to the sink device. In some embodiments, the providing of the Vbus_c is compatible with the USB-PD standard. Power control analog subsystem may receive Vbus_in from power converter. The power control analog subsystem may output Vbus_in. In some embodiments, power control analog subsystem is a USB Type-C™ controller compatible with the USB Type-C™ standard. The power control analog subsystem may provide system interrupts responsive to the Vbus_in and the Vbus_c.

In some embodiments, any of the components of SBPD device may be part of an IC or alternatively any of the components of SBPD device may be implemented in its own IC. For example, power converter and power control analog subsystem may each be discrete ICs with separate packaging and pin configurations.

In some embodiments, the SBPD device may provide a complete USB Type-C™ and USB-Power Delivery port control solution for notebooks, dongles, monitors, docking stations, power adapters, vehicle chargers, power banks, mobile adaptors, and the like.

Figure 5:
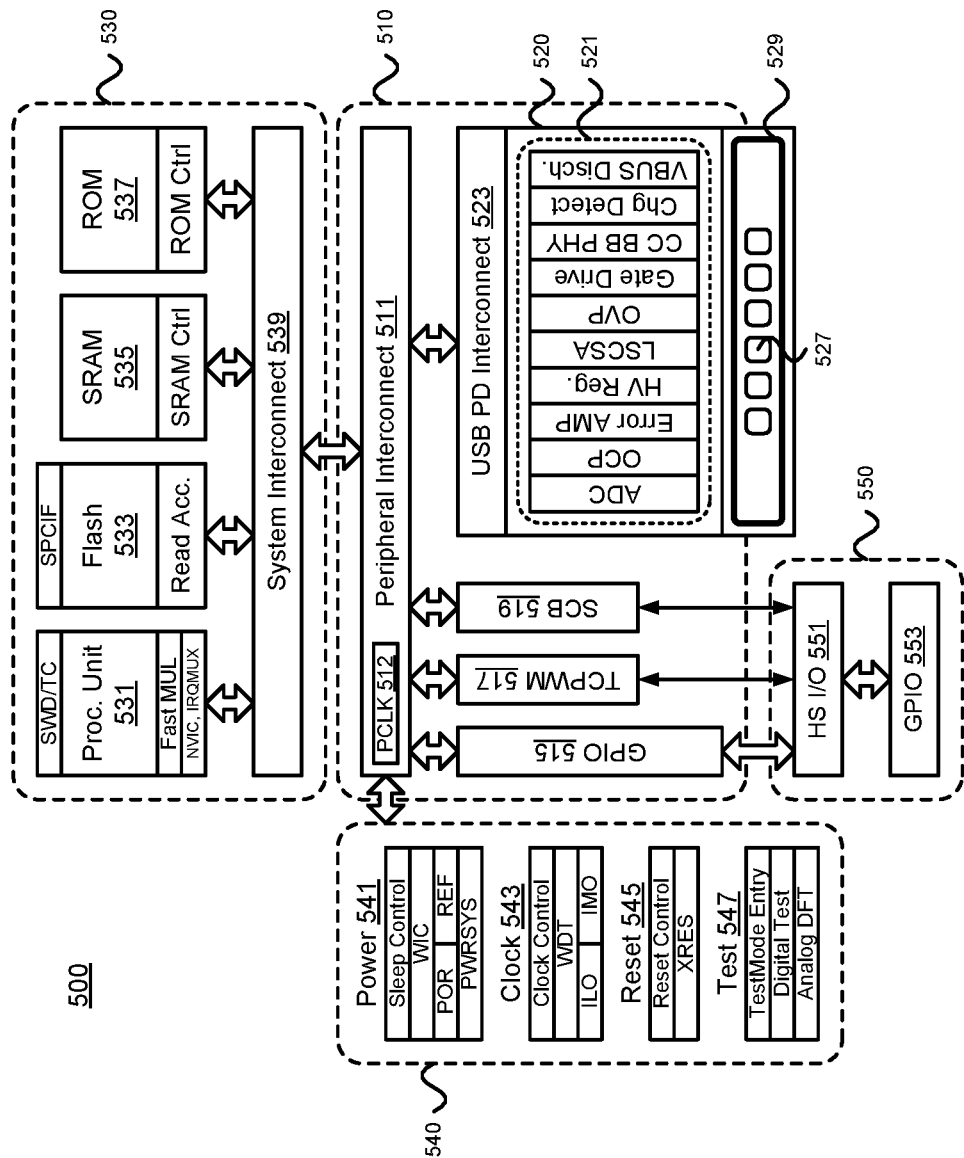
FIG. 5 is a block diagram illustrating a system for a USB device for use in USB power delivery in accordance with some embodiments.

FIG. 5 is a block diagram illustrating a system 500 for a USB device for use in USB power delivery in accordance with some embodiments. System 500 may include a peripheral subsystem 510 including a number of components for use in USB Power Delivery (USB-PD). Peripheral subsystem 510 may include a peripheral interconnect 511 including a clocking module, peripheral clock (PCLK) 512 for providing clock signals to the various components of peripheral subsystem 510. Peripheral interconnect 511 may be a peripheral bus, such as a single-level or multi-level advanced high-performance bus (AHB), and may provide a data and control interface between peripheral subsystem 510, CPU subsystem 530, and system resources 540. Peripheral interconnect 511 may include controller circuits, such as direct memory access (DMA) controllers, which may be programmed to transfer data between peripheral blocks without input by, control of, or burden on CPU subsystem 530.

The peripheral interconnect 511 may be used to couple components of peripheral subsystem 510 to other components of system 500. Coupled to peripheral interconnect 511 may be a number of general purpose input/outputs (GPIOs) 515 for sending and receiving signals. GPIOs 515 may include circuits configured to implement various functions such as pull-up, pull-down, input threshold select, input and output buffer enabling/disable, single multiplexing, etc. Still other functions may be implemented by GPIOs 515. One or more timer/counter/pulse-width modulator (TCPWM) 517 may also be coupled to the peripheral interconnect and include circuitry for implementing timing circuits (timers), counters, pulse-width modulators (PWMs) decoders, and other digital functions that may operate on I/O signals and provide digital signals to system components of system 500. Peripheral subsystem 510 may also include one or more serial communication blocks (SCBs) 519 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 510 may include a USB power delivery subsystem 520 coupled to the peripheral interconnect and comprising a set of USB-PD modules 521 for use in USB power delivery. USB-PD modules 521 may be coupled to the peripheral interconnect 511 through a USB-PD interconnect 523. USB-PD modules 521 may include an analog-to-digital conversion (ADC) module for converting various analog signals to digital signals; an error amplifier (AMP) for regulating the output voltage on VBUS line per a PD contract; a high-voltage (HV) regulator for converting the power source voltage to a precise voltage (such as 3.5-5V) to power system 500; a low-side current sense amplifier (LSCSA) for measuring load current accurately, an over voltage protection (OVP) module and an over-current protection (OCP) module for providing over-current and over-voltage protection on the VBUS line with configurable thresholds and response times; one or more gate drivers for external power field effect transistors (FETs) used in USB power delivery in provider and consumer configurations; and a communication channel PHY (CC BB PHY) module for supporting communications on a Type-C communication channel (CC) line. USB-PD modules 521 may also include a charger detection module for determining that a charging circuit is present and coupled to system 500 and a VBUS discharge module for controlling discharge of voltage on VBUS. The discharge control module may be configured to couple to a power source node on the VBUS line or to an output (power sink) node on the VBUS line and to discharge the voltage on the VBUS line to the desired voltage level (i.e., the voltage level negotiated in the PD contract). USB power delivery subsystem 520 may also include pads 527 for external connections and electrostatic discharge (ESD) protection circuitry 529, which may be required on a Type-C port. USB-PD modules 521 may also include a communication module for retrieving and communicating information stored in non-volatile memory one controller with another controller, such as between a primary-side controller and a secondary-side controller of a flyback converter.

GPIO 515, TCPWM 517, and SCB 519 may be coupled to an input/output (I/O) subsystem 550, which may include a high-speed (HS) I/O matrix 551 coupled to a number of GPIOs 553. GPIOs 515, TCPWM 517, and SCB 519 may be coupled to GPIOs 553 through HS I/O matrix 551.

System 500 may also include a central processing unit (CPU) subsystem 530 for processing commands, storing program information, and data. CPU subsystem 530 may include one or more processing units 531 for executing instructions and reading from and writing to memory locations from a number of memories. Processing unit 531 may be a processor suitable for operation in an integrated circuit (IC) or a system-on-chip (SOC) device. In some embodiments, processing unit 531 may be optimized for low-power operation with extensive clock gating. In this embodiment, various internal control circuits may be implemented for processing unit operation in various power states. For example, processing unit 531 may include a wake-up interrupt controller (WIC) configured to wake the processing unit up from a sleep state, allowing power to be switched off when the IC or SOC is in a sleep state. CPU subsystem 530 may include one or more memories, including a flash memory 533, and static random access memory (SRAM) 535, and a read-only memory (ROM) 537. Flash memory 533 may be a non-volatile memory (NAND flash, NOR flash, etc.) configured for storing data, programs, and/or other firmware instructions. Flash memory 533 may include a read accelerator and may improve access times by integration within CPU subsystem 530. SRAM 535 may be a volatile memory configured for storing data and firmware instructions accessible by processing unit 531. ROM 537 may be configured to store boot-up routines, configuration parameters, and other firmware parameters and settings that do not change during operation of system 500. SRAM 535 and ROM 537 may have associated control circuits. Processing unit 531 and the memories may be coupled to a system interconnect 539 to route signals to and from the various components of CPU subsystem 530 to other blocks or modules of system 500. System interconnect 539 may be implemented as a system bus such as a single-level or multi-level AHB. System interconnect 539 may be configured as an interface to couple the various components of CPU subsystem 530 to each other. System interconnect 539 may be coupled to peripheral interconnect 511 to provide signal paths between the components of CPU subsystem 530 and peripheral subsystem 510.

System 500 may also include a number of system resources 540, including a power module 541, a clock module 543, a reset module 545, and a test module 547. Power module 541 may include a sleep control module, a wake-up interrupt control (WIC) module, a power-on-reset (POR) module, a number of voltage references (REF), and a PWRSYS module. In some embodiments, power module 541 may include circuits that allow system 500 to draw and/or provide power from/to external sources at different voltage and/or current levels and to support controller operation in different power states, such as active, low-power, or sleep. In various embodiments, more power states may be implemented as system 500 throttles back operation to achieve a desired power consumption or output. Clock module 543 may include a clock control module, a watchdog timer (WDT), an internal low-speed oscillator (ILO), and an internal main oscillator (IMO). Reset module 545 may include a reset control module and an external reset (XRES) module. Test module 547 may include a module to control and enter a test mode as well as testing control modules for analog and digital functions (digital test and analog DFT).

System 500 may be implemented in a monolithic (e.g., single) semiconductor die. In other embodiments, various portions or modules of system 500 may in implemented on different semiconductor dies. For example, memory modules of CPU subsystem 530 may be on-chip or separate. In still other embodiments, separate-die circuits may be packaged into a single "chip," or remain separate and disposed on a circuit board (or in a USB cable connector) as separate elements.

System 500 may be implemented in a number of application contexts to provide USB-PD functionality thereto. In each application context, an IC controller or SOC implementing system 500 may be disposed and configured in an electronic device (e.g., a USB-enabled device) to perform operations in accordance with the techniques described herein. In one example embodiment, a system 500 may be disposed and configured in a personal computer (PC) power adapter for a laptop, a notebook computer, etc. In another example embodiment, system 500 may be disposed and configured in a power adapter (e.g., a wall charger) for a mobile electronic device (e.g., a smartphone, a tablet, etc.). In another example embodiment, system 500 may be disposed and configured in a wall socket that is configured to provide power over USB Type-A and/or Type-C port(s). In another example embodiment, system 500 may be disposed and configured in a car charger that is configured to provide power over USB Type-A and/or Type-C port(s). In yet another example embodiment, system 500 may be disposed and configured in a power bank that can get charged and then provide power to another electronic device over a USB Type-A or Type-C port. In other embodiments, a system like system 500 may be configured with the power switch gate control circuitry described herein and may be disposed in various other USB-enabled electronic or electro-mechanical devices.

It should be understood that a system, like system 500 implemented on or as an IC controller may be disposed into different applications, which may differ with respect to the type of power source being used and the direction in which power is being delivered. For example, in the case of a car charger, the power source is a car battery that provides DC power, while in the case of a mobile power adapter the power source is an AC wall socket. Further, in the case of a PC power adapter the flow of power delivery is from a provider device to consumer device, while in the case of a power bank the flow of power delivery may be in both directions depending on whether the power bank is operating as a power provider (e.g., to power another device) or as a power consumer (e.g., to get charged itself). For these reasons, the various applications of system 500 should be regarded in an illustrative rather than a restrictive sense.

Figure 6:
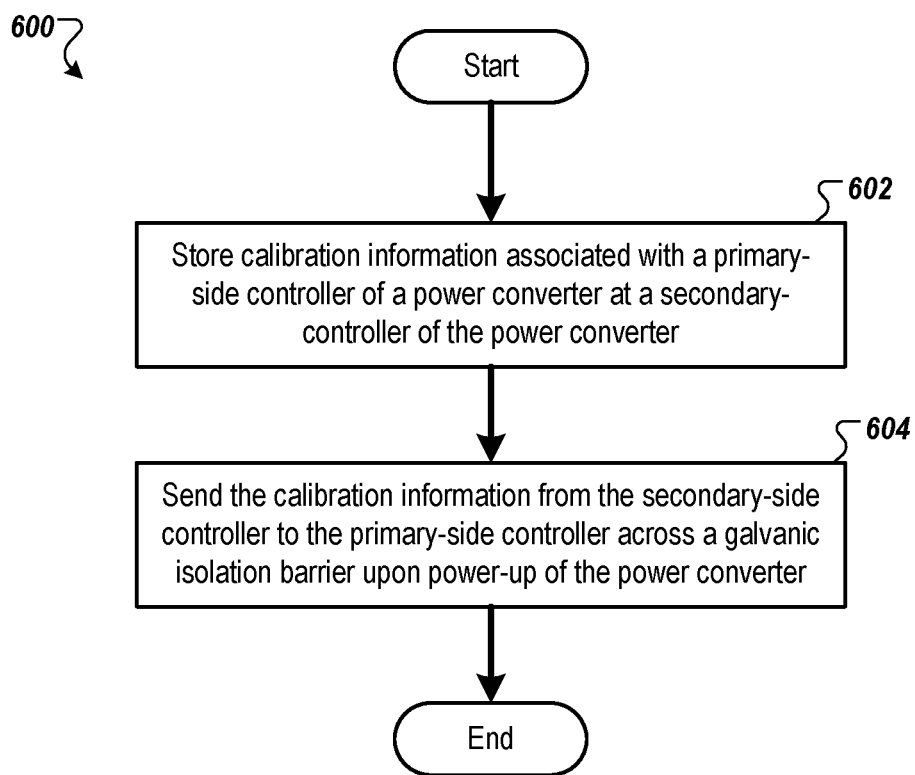
FIG. 6 is a flow diagram of a method of storing information by a secondary-side controller and communicating the information to a primary-side controller across a galvanic isolation barrier according to one embodiment.

FIG. 6 is a flow diagram of a method 600 of storing information by a secondary-side controller and communicating the information to a primary-side controller across a galvanic isolation barrier according to one embodiment. The method 600 may be performed by processing logic that comprises hardware (e.g., circuitry, dedicated logic, programmable logic, microcode, etc.), software, firmware, or a combination thereof. In one embodiment, the secondary-side controller in a secondary-controlled AC-DC flyback converter performs the method 600. In another embodiment, the secondary-side controller 116 of FIG. 1 performs the method 600. In another embodiment, the secondary-side controller 316 of FIG. 3 performs the method 600. In another embodiment, the secondary IC controller 516 of FIG. 5 performs the method 600. In another embodiment, the peripheral subsystem 510 of FIG. 5 performs the method 700. In some cases, the operations of method 600 can be distributed between the primary-side controller and the secondary-side controller.

Referring to FIG. 6, the method 600 begins by the processing logic storing, calibration information, associated with a primary-side controller of the power converter, at a secondary-side controller of a power converter (such as an isolated power converter) (block 602). The power converter can be a secondary-controlled AC-DC flyback converter with a galvanic isolation barrier. The processing logic sends the calibration information to the primary-side controller across the galvanic isolation barrier from the secondary-side controller in response to power-up of the power converter (block 604). Once the transfer of calibration information is complete, the method 600 ends.

In a further embodiment, the processing logic sends the calibration information by sending the calibration information as pulse information via a pulse transformer of the secondary-side controller. In another embodiment, to send the calibration information, the processing logic generates a PWM pulse signal and applies the PWM pulse signal to a secondary side of a pulse transformer. Applying the PWM pulse signal to the secondary side of the pulse transformer induces a signal on a primary side of the pulse transformer to send the calibration information to the primary-side controller across the galvanic isolation barrier. A pulse receiver of the primary-side controller can receive the signal on the primary side of the pulse transformer and output, a control signal to a gate of a primary FET via a gate driver of the primary-side controller. The control signal turns the primary switching FET on and off to control a flyback transformer of the power converter.

In a further embodiment, the processing logic sends a signal with a specific pattern to notify the primary-side controller that the secondary-side controller is to send the calibration information in a pre-defined sequence. The processing logic sends the calibration information in the pre-defined sequence across the galvanic isolation barrier after sending the signal with the specific pattern. The processing logic can send the signal with the specific pattern without clock synchronization of the primary-side controller and the secondary-side controller.

In one embodiment, the processing logic stores the calibration information in non-volatile memory of the secondary-side controller, such as at specific locations or reserved regions in the non-volatile memory.

In some embodiments, the calibration information includes generic calibration information, as well as trimming data for the primary-side controller. In other embodiments, trimmed parameters, or trimmed values for parameters can be stored in the non-volatile memory. These trimmed parameters or trimmed values can be updated in the non-volatile memory of the secondary-side controller to adjust operations of the primary-side controller. In other cases, trimming information can be stored separately from calibration information. As described herein, by providing trimmed parameters on the primary-side controller, the system can provide better accuracy based on trimmed parameters without increasing primary controller's die.

In another embodiment, the calibration information includes firmware-based modifications to firmware of the primary-side controller. The firmware-based modifications relate to the at least one of a primary side of the power converter or a specific circuit board in which the power converter is disposed. The firmware-based modifications can also be stored in the non-volatile memory of the secondary-side controller.

In another embodiment, the calibration information includes user-defined settings (e.g., line UV, OV, peak current, soft-start ramp, oscillator frequency, or the like) pertaining to a primary side of the power converter. The processing logic can store the user-defined settings in non-volatile memory of the secondary-side controller.

In another embodiment, the processing logic controls a programmable slow pull-up transistor at an input of the pulse transformer followed by a faster pull-down transistor to generate a first negative pulse. The processing logic controls the programmable slow pull-up transistor at the input of the pulse transformer followed by the faster pull-down transistor to generate a second negative pulse without an intervening positive pulse (e.g., two –ve edges without a +ve edge). In one embodiment, the processing logic controls the programmable slow pull-up transistor with a resistive pull-up transistor (or a resistive pull-down transistor). In another embodiment, the processing logic controls the programmable slow pull-up transistor with a current source-based pull-up transistor. In another embodiment, the processing logic controls a programmable slow pull-down transistor at an input of the pulse transformer followed by a faster pull-up transistor to generate a first positive pulse and controlling the programmable slow pull-down transistor at the input of the pulse transformer followed by the faster pull-up transistor to generate a second positive pulse without an intervening negative pulse (e.g., two +ve edges without a –ve edge). The two or more consecutive ones or a pattern of zeros and ones can be used to communicate information stored at the secondary-side controller to the primary-side controller. The specific pattern can be used to initiate the transfer of information or the specific pattern can be part of the information being transferred.

Figure 7:
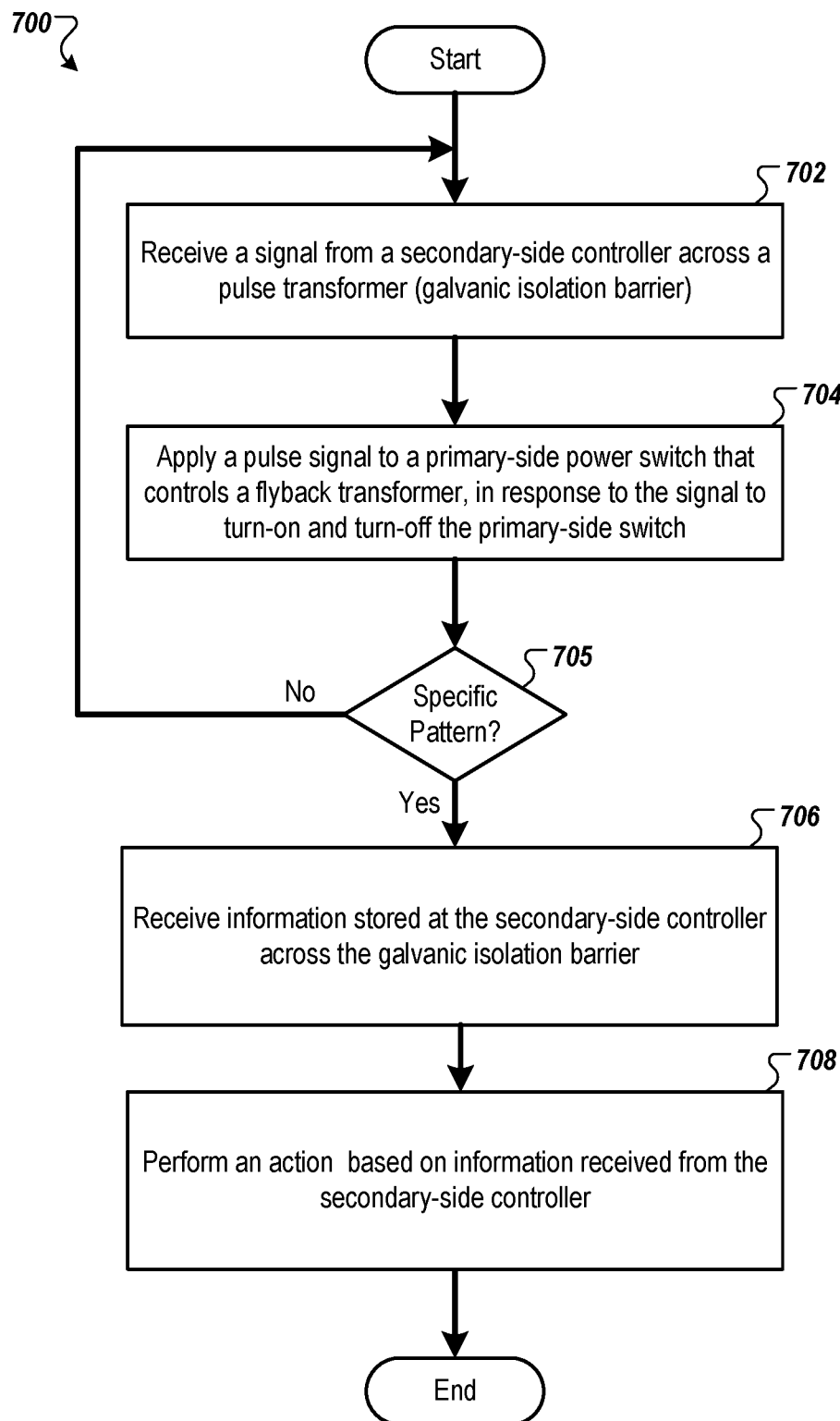
FIG. 7 is a flow diagram of a method of storing information by a secondary-side controller and communicating the information to a primary-side controller across a galvanic isolation barrier according to another embodiment.

FIG. 7 is a flow diagram of a method 700 of storing information by a secondary-side controller and communicating the information to a primary-side controller across a galvanic isolation barrier according to another embodiment. The method 700 may be performed by processing logic that comprises hardware (e.g., circuitry, dedicated logic, programmable logic, microcode, etc.), software, firmware, or a combination thereof. In one embodiment, a primary-side controller in a secondary-controlled AC-DC flyback converter performs the method 700. In another embodiment, the secondary-side controller 116 of FIG. 1 performs the method 700. In another embodiment, the secondary-side controller 316 of FIG. 3 performs the method 700. In another embodiment, the secondary IC controller 516 of FIG. 5 performs the method 700. In another embodiment, the peripheral subsystem 510 of FIG. 5 performs the method 700. In some cases, the operations of method 700 can be distributed between the primary-side controller and the secondary-side controller.

Referring to FIG. 7, the method 700 begins by the processing logic receiving a signal from a secondary-side controller across a galvanic isolation barrier (block 702). The processing logic applies a pulse signal to a primary-side power switch (e.g., primary-side FET), coupled to a flyback transformer in a secondary-controlled AC-DC flyback converter, in response to the signal to turn-on and turn-off the primary-side power switch (block 704). The processing logic detects whether a specific pattern has been sent over the galvanic isolation barrier (block 705). When no specific pattern has been detected at block 705, the processing logic returns to block 702 to receive additional pulse signals from the secondary-side controller. When the specific pattern is detected at block 705, the processing logic receives information stored at the secondary-side controller across the galvanic isolation barrier (block 706) and performs an action based on the information received from the secondary-side controller (block 708). For example, the processing logic can receive first information to program or calibrate a first component of the primary-side controller. Once the first component is calibrated or programmed, the processing logic can receive second information to program or calibrate a second component of the primary-side controller, and so on. Once all the components are programmed or calibrated, the method 700 ends. In another embodiment, other information can be received and other actions can be performed by the processing logic on the primary-side controller.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An alternative current to direct current (AC-DC) power adapter device comprising:
    a flyback transformer, coupled between AC terminals and DC terminals, including first galvanic isolation barrier;
    a primary-side controller configured to control a primary-side power switch, wherein the primary-side power switch is coupled to a primary side of the flyback transformer;
    a secondary-side controller configured to control a secondary-side power switch, wherein the secondary-side power switch is coupled to a secondary side of the flyback transformer;
    a secondary-side field-effect transistor (FET) coupled between the secondary side of the flyback transformer and a ground line of a port connecting to the DC terminal; and
    a pulse transformer including second galvanic isolation barrier between the primary-side controller and secondary-side controllers, wherein the secondary-side controller comprises non-volatile memory and is configured to:
        store information associated with the primary-side controller; and
        send the information to the primary-side controller across the second galvanic isolation barrier.

2. The AC-DC power adapter device of claim 1, wherein the primary-side controller comprises:
    a pulse receiver to receive a signal from the secondary-side controller across the second galvanic isolation barrier; and
    a gate driver coupled to the pulse receiver configured to control operation of the primary-side power switch.

3. The AC-DC power adapter device of claim 1, wherein the port is a USB Type-C port.

4. The AC-DC power adapter device of claim 1, wherein the secondary-side controller is further configured to:
    send a signal to notify the primary-side controller that the secondary-side controller is to send the information in a pre-defined sequence.

5. The AC-DC power adapter device of claim 1, further comprising:
    a rectifier coupled between the AC terminal and an AC line (Vin), wherein the AC line is coupled to a first end of a primary winding of the flyback transformer, wherein a second end of the primary winding is coupled to a primary drain of the primary-side power switch, wherein a first end of a secondary winding of the flyback transformer is coupled to a direct current (DC) output line (VBUS) and a second end of the secondary winding is coupled to a secondary drain of a secondary-side power switch; and a bulk capacitor coupled between the AC line and a ground node.

6. The AC-DC power adapter device of claim 5, wherein the primary-side controller is further configured to:
receive a turn-on pulse from the secondary-side controller;
apply the turn-on pulse to a gate of the primary-side power switch, the turn-on pulse causing a primary drain of the primary-side power switch to go from a low state to a high state and the secondary drain of the secondary-side power switch to go from a low state to a high state;
receive a turn-off pulse from the secondary-side controller; and
apply the turn-off pulse to the gate of the primary-side power switch, the turn-off pulse causing the primary-side power switch to go low and the secondary drain to go low.

7. The AC-DC power adapter device of claim 1, wherein the primary-side controller comprises logic circuitry to detect a specific pattern in a signal from the pulse transformer.

8. The AC-DC power adapter device of claim 1, wherein the primary-side controller comprises logic circuitry to detect at least two consecutive zeros or two consecutive ones in a signal from the pulse transformer.

9. An alternative current to direct current (AC-DC) flyback converter comprising:
a flyback transformer coupled between an AC terminal and a DC terminal;
a primary-side controller coupled to the flyback transformer; and
a secondary-side controller coupled to the flyback transformer, wherein the flyback transformer comprises non-volatile memory to store calibration information associated with the primary-side controller, wherein the secondary-side controller is configured to send the calibration information to the primary-side controller across a galvanic isolation barrier of the AC-DC flyback converter in response to power-up of the AC-DC flyback converter; and
a secondary-side field-effect transistor (FET) controlled by the secondary-side controller, wherein the secondary-side FET is coupled between the flyback transformer and a ground line of a port connecting to the DC terminal.

10. The AC-DC flyback converter of claim 9, further comprising a pulse transformer coupled between the primary-side controller and the secondary-side controller.

11. The AC-DC flyback converter of claim 9, wherein the secondary-side controller comprises non-volatile memory to store the calibration information.

12. The AC-DC flyback converter of claim 9, wherein the secondary-side controller comprises a programmable driver with pull-up and pull-down circuitry to send a signal with a specific pattern to notify the primary-side controller that the secondary-side controller is to send the calibration information in a pre-defined sequence.

13. A method comprising:
storing, by a secondary-side controller of a power converter, calibration information associated with a primary-side controller of the power converter, wherein the power converter is a secondary-controlled alternating current to direct current (AC-DC) flyback converter comprising a galvanic isolation barrier;
sending, by the secondary-side controller, the calibration information to the primary-side controller across the galvanic isolation barrier in response to power-up of the power converter;
receiving a turn-on pulse from the secondary-side controller;
applying the turn-on pulse, by the primary-side controller, to a gate of the primary-side power switch, the turn-on pulse causing a primary drain of a primary-side power switch to go from a low state to a high state and a secondary drain of a secondary-side power switch to go from a low state to a high state;
receiving a turn-off pulse from the secondary-side controller; and
applying the turn-off pulse, by the primary-side controller, to the gate of the primary-side power switch, the turn-off pulse causing the primary-side power switch to go low and the secondary drain to go low.

14. The method of claim 13, wherein sending the calibration information comprises sending, by a pulse transformer of the secondary-side controller to the primary-side controller across the galvanic isolation barrier, the calibration information as pulse information.

15. The method of claim 13, wherein sending the calibration information comprises:
generating, by a pulse width modulation (PWM) controller of the secondary-side controller, a PWM pulse signal; and
applying the PWM pulse signal to a secondary side of a pulse transformer, wherein applying the PWM pulse signal to the secondary side of the pulse transformer induces a signal on a primary side of the pulse transformer to send the calibration information to the primary-side controller across the galvanic isolation barrier.

16. The method of claim 13, further comprising:
receiving, by a pulse receiver of the primary-side controller, the signal on the primary side of the pulse transformer; and
outputting, by the pulse receiver, a control signal to a gate of a primary switching field effect transistor (FET) via a gate driver of the primary-side controller, wherein the control signal turns the primary switching FET on and off to control a flyback transformer of the power converter.

17. The method of claim 13, further comprising sending, by the secondary-side controller to the primary-side controller, a signal with a specific pattern to notify the primary-side controller that the secondary-side controller is to send the calibration information in a pre-defined sequence, and wherein sending the calibration information comprises sending the calibration information in the pre-defined sequence across the galvanic isolation barrier after sending the signal with the specific pattern.

18. The method of claim 13, further comprising sending, by the secondary-side controller to the primary-side controller, a signal with a specific pattern without clock synchronization of the primary-side controller and the secondary-side controller to notify the primary-side controller that the secondary-side controller is to send the calibration information in a pre-defined sequence.

19. The method of claim 13, wherein the calibration information comprises trimming data for the primary-side controller, and wherein storing the calibration information comprises storing the trimming data in non-volatile memory (NVM) of the secondary-side controller.

20. The method of claim 13, wherein the calibration information comprises firmware-based modifications to firmware of the primary-side controller, wherein the firmware-based modifications relate to the at least one of a primary side of the power converter or a specific circuit board in which the power converter is disposed, and wherein storing the calibration information comprises storing the firmware-based modifications in nonvolatile memory (NVM) of the secondary-side controller.

21. The method of claim 13, wherein the calibration information comprises user-defined settings pertaining to the primary-side controller, and wherein storing the calibration information comprises storing the user-defined settings in non-volatile memory (NVM) of the secondary-side controller.

* * * * *